(12) United States Patent
Ozao

(10) Patent No.: US 7,649,391 B2
(45) Date of Patent: Jan. 19, 2010

(54) CLOCK SIGNAL TRANSMISSION CIRCUIT

(75) Inventor: Ryoko Ozao, Kasugai (JP)

(73) Assignee: Fujitsu Microelectronics Limited, Tokyo (JP)

( * ) Notice: Subject to any disclaimer, the term of this patent is extended or adjusted under 35 U.S.C. 154(b) by 0 days.

(21) Appl. No.: 12/048,960

(22) Filed: Mar. 14, 2008

(65) Prior Publication Data
US 2008/0231334 A1    Sep. 25, 2008

(30) Foreign Application Priority Data
Mar. 14, 2007    (JP) ............................... 2007-065345

(51) Int. Cl.
*H03L 7/00* (2006.01)
(52) U.S. Cl. ...................... 327/161; 327/141; 327/291
(58) Field of Classification Search ................ 327/141, 327/142, 154, 155, 160, 161, 198, 291
See application file for complete search history.

(56) References Cited
U.S. PATENT DOCUMENTS
6,137,850 A * 10/2000 Miller ........................ 375/354

6,563,359 B2 *   5/2003  Kitagawa et al. ............ 327/291
2007/0170960 A1 *   7/2007  Sakai et al. ................. 327/142
2008/0290919 A1 * 11/2008  Lee ............................ 327/161

FOREIGN PATENT DOCUMENTS
JP          4-362719        12/1992

* cited by examiner

Primary Examiner—Long Nguyen
Assistant Examiner—Shikha Goyal
(74) Attorney, Agent, or Firm—Arent Fox LLP

(57) ABSTRACT

A clock signal transmission circuit having a variable initial value for a wait time that is required until a clock signal stabilizes. The clock signal is generated from an original clock signal. The wait time setting unit generates a plurality of wait time signals to wait until the original clock signal stabilizes before providing the clock signal to the internal circuit. A wait time determination unit selects one of the wait time signals and provides the selected wait time signal to a clock control unit. The wait time determination unit includes a data holding circuit which generates a selection signal in accordance with the initial value, a selection circuit which selects one of the wait time signals based on the selection circuit, and an initial value setting circuit enabling the initial value to be varied.

14 Claims, 4 Drawing Sheets

| SL2 | SL1 | Stable Oscillation Wait Time | Original Oscillation 4MHz | Sub- Oscillation 32KHz |
|---|---|---|---|---|
| 0 | 0 | $\phi \times 2^{14}$ | 8.2 [ms] | 512 [ms] |
| 0 | 1 | $\phi \times 2^{16}$ | 32.8 [ms] | 2.0 [s] |
| 1 | 0 | $\phi \times 2^{10}$ | 512 [μs] | 32.0 [ms] |
| 1 | 1 | $\phi \times 2^{1}$ | 1.0 [μs] | 62.5 [μs] |

| RST | RST MASK | CL |
|-----|----------|-----|
| 1 | 1 | 1 |
| 1 | 0 | 0 |
| 0 | 1 | 1 |
| 0 | 0 | 1 |

CLOCK SIGNAL TRANSMISSION CIRCUIT

CROSS-REFERENCE TO RELATED APPLICATIONS

This application is based upon and claims the benefit of priority from the prior Japanese Patent Application No. 2007-065345, filed on Mar. 14, 2007, the entire contents of which are incorporated herein by reference.

BACKGROUND

The present application relates to a clock signal transmission circuit for providing a stable clock signal to an internal circuit.

In a semiconductor integrated circuit device, an internal circuit is operated based on a clock signal generated by a clock signal generation circuit. Such a semiconductor integrated circuit device includes a clock signal transmission circuit. When the semiconductor integrated circuit is activated, the clock signal transmission circuit provides the internal circuit with the clock signal after the clock signal stabilizes. It is required that the clock signal transmission circuit readily provides the internal circuit with a stable clock signal.

In the semiconductor integrated circuit device, a clock signal generation circuit, which uses a crystal oscillator, provides the clock signal via the clock signal transmission circuit to the internal circuit. The internal circuit is operated based on the clock signal.

During activation of the semiconductor integrated circuit device, when power is supplied, various types of settings are initialized. Then, after an original clock signal output from the clock signal generation circuit stabilizes, the clock signal transmission circuit provides the internal circuit with a clock signal. An example of a clock signal transmission circuit in the prior art will now be described with reference to FIG. 1A.

When power is supplied, a clock signal generation circuit (not shown) inputs complementary original clock signals CLKX and /CLKX ("/" represents bar) to terminals X0 and X1, respectively. The original clock signal CLKX is fed to a hysteresis inverter circuit 1, and the original clock signal /CLKX is fed to a NAND circuit 2. An inverter circuit 3 and a transfer gate 4 function when the terminal X1 is used as an output terminal and do not function when the original clock signals CLKX and /CLKX are input to the terminals X0 and X1.

The hysteresis inverter circuit 1 provides the original clock signal CLKX to a register circuit 5 (clock generation unit), which is configured by a flip-flop circuit. The register circuit 5 divides the original clock signal CLKX into two cycles to generate a clock signal CLK. Then, the register circuit 5 outputs and provides the clock signal CLK as an output signal Q to a counter 6 and a clock control unit 7.

The counter 6 is a 16-bit counter for counting the pulses of the output signal Q. When the count becomes $2^1$, the counter 6 provides a selector 8 with an output signal OS11, which is set at a high level. In the same manner, the counter 6 provides the selector 8 with an output signal OS10, which is set at a high level, when the count becomes $2^{10}$, an output signal OS00, which is set at a high level, when the count becomes $2^{14}$, and an output signal OS01, which is set at a high level, when the count becomes $2^{16}$. In response to selection signals SL1 and SL2 respectively provided from register circuits 9a and 9b, one of the output signals OS11 to OS00 is selected as an output signal X, which is provided to a register circuit 10.

The register circuits 9a and 9b respectively provide the selector 8 with the selection signals SL1 and SL2 as data D, which is provided from the CPU 11 via a bus 12. For example, when the selection signals SL1 and SL2 configure the data of "11", the selector 8 provides the register circuit 10 with the output signal OS11 of the counter 6. When the selection signals SL1 and SL2 configure the data of "00", the selector 8 provides the register circuit 10 with the output signal OS00 of the counter 6.

When a semiconductor integrated circuit device incorporating the clock signal transmission circuit is activated or reset, the register circuits 5, 9a, and 9b are provided with a reset signal RST. When the reset signal RST is shifted to a low level, the data D, which is stored in the register circuits 9a and 9b is reset to "0", and the output signal Q of the register circuit 5 is reset to a low level.

The register circuit 10 is provided with the output signal X of the selector 8 as an enable signal EN. When the enable signal EN shifts to a high level, the register circuit 10 provides the clock control unit 7 with an output signal Q having a low level.

When the output signal Q of the register circuit 10 rises to a high level, the clock control unit 7 provides the clock signal CLK output from the register circuit 5 to a CPU 11. The output signal Q of the register circuit 10 is reset by a low level clear signal CL, which is output from the clock control unit 7.

In such a clock signal transmission circuit, when the semiconductor integrated circuit device is activated, the selection signals SL1 and SL2 of the register circuits 9a and 9b are both set at a low level, or "00", by the reset signal RST.

As a result, the selector 8 provides the register circuit 10 with the output signal OS00 of the counter 6. Accordingly, after $2^{14}$ pulses of the clock signal CLK are counted during activation, the clock control unit 7 provides the CPU 11 with the clock signal CLK.

Referring to FIG. 1B, the clock signal transmission circuit provides the clock signal CLK, which is generated from the original clock signal CLKX, to the CPU 11 after a wait time T elapses. The wait time T is the time required for stabilization of the original clock signal CLKX, which is generated by the clock signal generation circuit, when the semiconductor integrated circuit is activated.

FIG. 2 shows an example of the wait time T, which is set by the counter 6. When the selection signals SL1 and SL2 are "00" and the cycle of the clock signal CLK is represented by $\phi$, the wait time T is expressed as $T=\phi \times 2^{14}$. When the original clock signal CLKX is 4 MHz, the wait time T is 8.2 msec.

In the same manner, when the selection signals SL1 and SL2 are "10" (SL1=1, SL2=0), the wait time T, which is expressed by $\phi \times 2^{16}$, is 32.8 msec. When the selection signals SL1 and SL2 are "01" (SL1=0, SL2=1), the wait time T, which is expressed by $\phi \times 2^{10}$, is 512 μsec. When the selection signals SL1 and SL2 are "11", the wait time T, which is expressed by $\phi \times 2^1$, is 1.0 μsec.

Therefore, in the clock signal transmission circuit of the prior art, the selection signals SL1 and SL2 are reset to "00" during activation. Thus, the wait time T is 8.2 msec.

After the activation, the data of the register circuits 9a and 9b becomes rewritable by the CPU 11. Accordingly, when resetting an internal circuit, such as the CPU 11, the wait time T can be varied by changing the output signal X of the selector 8 to another output signal of the counter 6 based on predetermined data set for the register circuits 9a and 9b, namely, the selection signals SL1 and SL2.

When the semiconductor integrated circuit undergoes a function test, a scan shift test is conducted with a scan chain, which is formed by series-coupling a group of data holding circuits, such as flip-flop circuits, that are arranged on the semiconductor integrated circuit. The scan shift test is conducted to determine whether or not the data holding circuits are each functioning normally as a shift register.

FIG. 3 shows an example of a scan chain. In a register circuit group of register circuits 13a to 13c, a scan-out terminal SO of one of two register circuits that are arranged near each other on a chip is coupled to a scan-in terminal SI of the other one of the two register circuits. This couples the two register circuits in series. FIG. 3 shows only the three register circuits 13a to 13c. However, an actual scan chain includes thousands of register circuits that are coupled in series.

The register circuits 13a to 13c are provided with a scan mode signal SCAN_MD during a scan mode. Further, the register circuits 13a to 13c are provided via a selector 14 with a scan clock signal SCAN_CK during the scan mode and a normal clock signal CLKP during a normal mode.

The register circuits 13a to 13c are provided with the reset signal RST via an inverter circuit 15. When the reset signal RST rises to a high level, the data stored in each of the register circuits 13a to 13c is reset to, for example, "0". Input terminal D and output terminal Q in each of the register circuits 13a to 13c are the terminals used in a normal mode.

In such a scan chain, during the scan mode, scan data SIN is input to the scan-in terminal SI of the register circuit 13a, which is in the first stage, and then transferred to the register circuit 13b, which is in the next stage, in accordance with the scan clock signal SCAN_CK. When scan data OUT output from the register circuit in the final stage (i.e., the register circuit 13c in FIG. 3) is identical to the scan data SIN, which is input to the first stage register circuit 13a, this indicates that the register circuits are all functioning normally.

In the clock signal transmission circuit shown in FIG. 1A, during activation, the selection signals SL1 and SL2 output from the register circuits 9a and 9b are reset to "00". Thus, the wait time T during activation is fixed to the time required for the output signal OS00 of the counter 6 to shift to a high level. More specifically, if the clock signal CLKX is 4 MHz, the wait time T is fixed to 8.2 msec.

In a case in which a user selects and uses a clock signal generation circuit that generates the original clock signal, the wait time T may be reduced depending on differences in the characteristics of the crystal oscillator that configures the clock signal generation circuit.

However, in the clock signal transmission circuit of FIG. 1A, an initial value of the wait time T, that is, the initial values of the register circuits 9a and 9b, are fixed. Thus, even if characteristics of the clock signal generation circuit are such that reduction of the wait time T should be possible, the wait time T may be set such that it is unnecessarily long.

Japanese Laid-Open Patent Publication No. 4-362719 describes a stable oscillation waiting circuit that obtains a predetermined stable oscillation wait time for an operation clock. However, the initial value of the wait time during activation is also fixed in the circuit of the publication.

SUMMARY

According to an aspect of one embodiment, a clock signal transmission circuit for providing a clock signal to an internal circuit is provided. The clock signal transmission circuit comprises: a clock control unit which provides the internal circuit with the clock signal that is generated from an original clock signal; a wait time setting unit which generates a plurality of wait time signals to wait until the original clock signal stabilizes before providing the clock signal to the internal circuit; and a wait time determination unit which selects one of the plurality of wait time signals and provides the selected wait time signal to the clock control unit, the wait time determination unit including: a data holding circuit which generates a selection signal in accordance with an initial value; a selection circuit which selects one of the plurality of wait time signals based on the selection signal; and an initial value setting circuit which variably sets the initial value of the data holding circuit.

BRIEF DESCRIPTION OF THE DRAWINGS

The embodiment, together with objects and advantages thereof, may best be understood by reference to the following description of the presently preferred embodiment together with the accompanying drawings in which.

DETAILED DESCRIPTION OF THE PREFERRED EMBODIMENTS

Figure 1A:
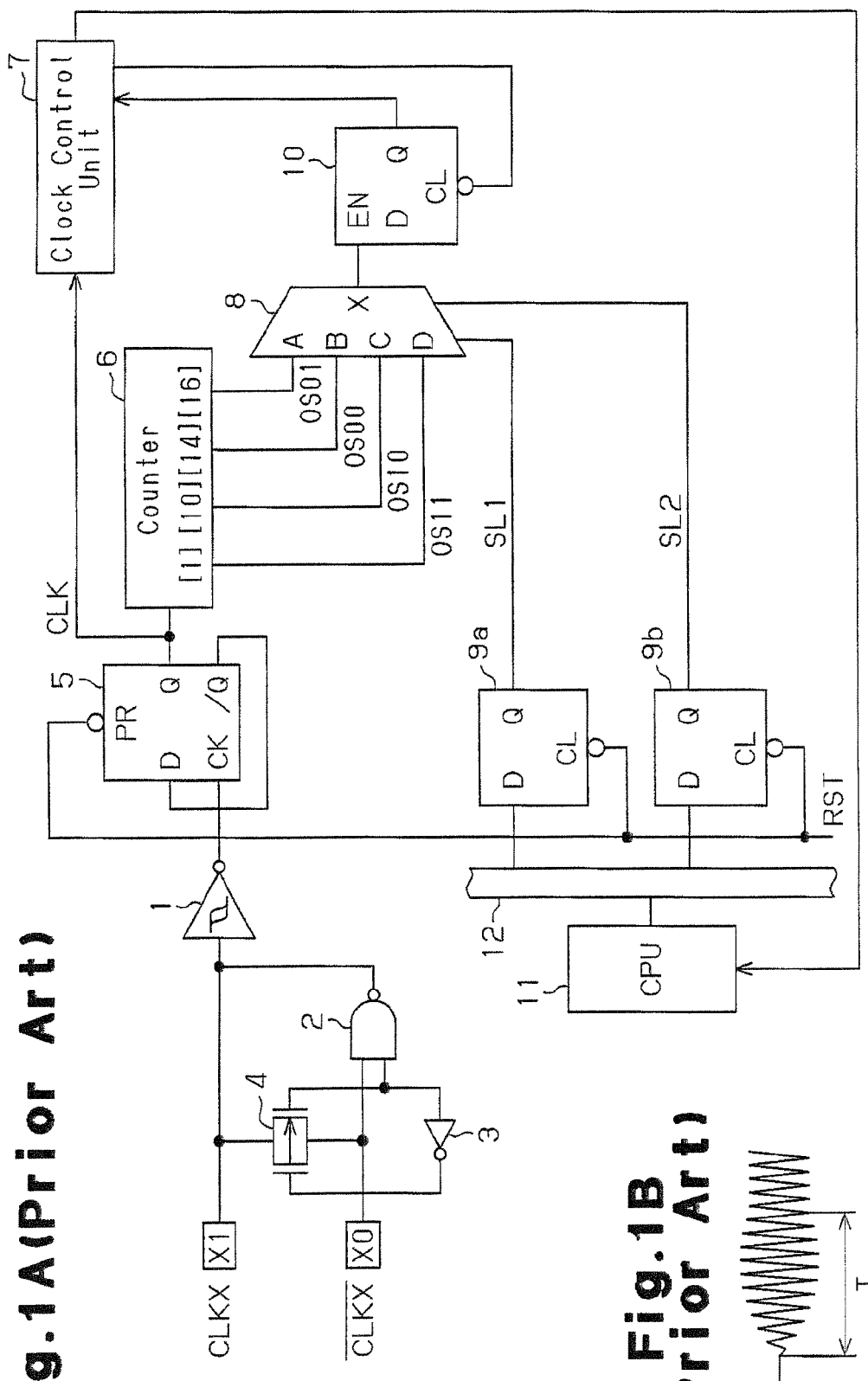
FIG. 1A is a schematic block circuit diagram of a conventional clock signal transmission circuit.
Figure 1B:
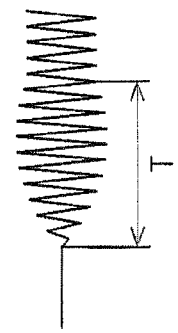
FIG. 1B is a schematic waveform diagram illustrating a wait time set for the clock signal transmission circuit of FIG. 1A during activation of a semiconductor integrated circuit device.

According to an aspect of one embodiment, a clock signal transmission circuit having a variable initial value for the wait time that is required until a clock signal stabilizes is provided.

In the drawings, like numerals are used for like elements throughout.

Figure 4:
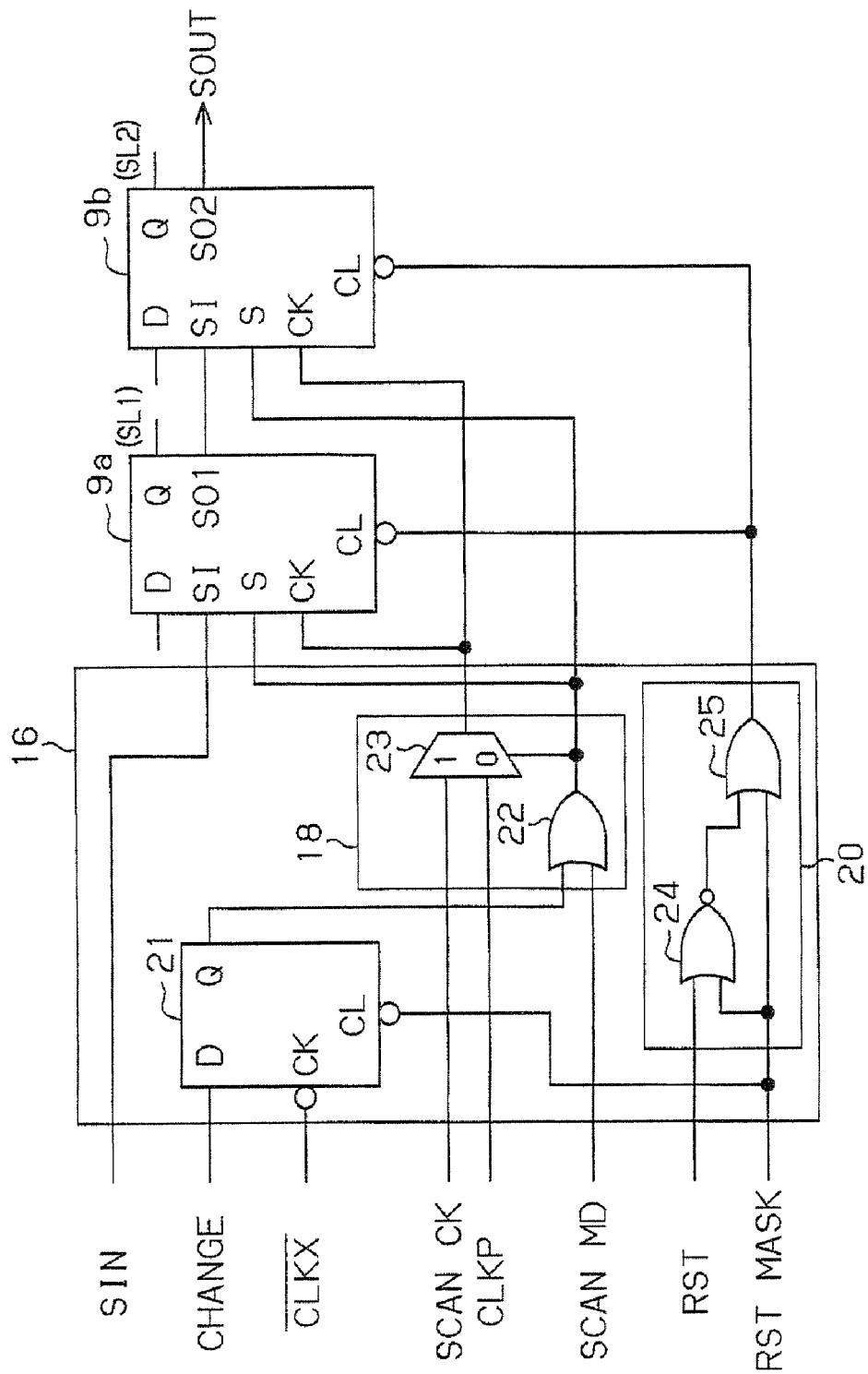
FIG. 4 is a schematic circuit diagram of a scan shift circuit according to a preferred embodiment.

A clock signal transmission circuit according to a preferred embodiment will now be discussed with reference to the drawings. The clock signal transmission circuit of the preferred embodiment is formed by adding an initial value setting circuit 16, which is shown in FIG. 4, to the clock signal transmission circuit of FIG. 1A. The initial value setting circuit 16 enables the initial value of the wait time to be varied during activation of, for example, a semiconductor integrated circuit device (including the clock signal transmission circuit). The wait time is the time required for the original clock signal CLKX, or the clock signal CLK, to stabilize.

In the preferred embodiment, the counter 6 shown in FIG. 1A functions as a wait time setting unit for setting a plurality of wait time signals (in the preferred embodiment, four wait time signals OS11, OS10, OS00, and OS01) so that the transmission of the clock signal CLK to the CPU 11 (internal circuit) is suspended until the original clock signal CLKX stabilizes. Further, the register circuits 9a and 9b (data holding circuits), the selector 8 (selection circuit), the register circuit 10, and the initial value setting circuit 16 shown in FIG. 4 form a wait time determination unit for determining the wait time signal that should be provided to the clock control unit 7.

FIG. 4 shows part of a scan shift circuit, which conducts a scan shift test. As shown in FIG. 4, the scan shift circuit includes the initial value setting circuit 16 and the register circuits 9a and 9b. More particularly, the scan shift circuit includes a plurality of register circuits arranged in the semiconductor integrated circuit. However, FIG. 4 shows only two of the plurality of register circuits, namely, the register circuits 9a and 9b. In other words, the register circuits 9a and 9b shown in FIG. 1A form only part of the scan shift circuit, which includes a plurality of register circuits.

The plurality of register circuits in the scan shift circuit are coupled in series so as to form a scan chain. The register circuits 9a and 9b are arranged at the head of the scan chain. More particularly, the register circuit 9a forms an initial stage circuit of the scan chain, and the register circuit 9b is coupled as a following stage circuit to the register circuit 9a. The register 9a is provided with scan data SIN.

The register circuits 9a and 9b are coupled to the initial value setting circuit 16. The initial value setting circuit 16 includes a register circuit 21 (transfer mode setting unit), a clock transmission unit 18, and a reset mask unit 20. The clock transmission unit 18 is formed by an OR circuit 22 and a selector 23. The reset mask unit 20 is formed by a NOR circuit 24 and an OR circuit 25. The initial value setting circuit 16 enables the setting of variable initial values for the register circuits 9a and 9b. More specifically, the register circuit 21, the clock transmission unit 18, and the reset mask unit 20 in the initial value setting circuit 16 function as a transfer control unit for transferring initial values to the register circuits 9a and 9b.

An external circuit (not shown) provides the register circuit 21 with a switching signal CHANGE as data D. The register circuit 21 is also provided with the original clock signal/CLKX as a clock signal CK. When the original clock signal/CLKX has a low level, the register circuit 21 latches the switching signal CHANGE and provides an output signal Q to the OR circuit 22.

The OR signal 22 is also provided with a scan mode signal SCAN_MD. The output signal of the OR circuit 22, based on the scan mode signal SCAN_MD and the output signal Q of the register circuit 21, is provided as a selection signal to the selector 23. The output signal of the OR circuit 22 is also provided as an input signal S to each register circuit in the scan chain, which includes the register circuits 9a and 9b. When the input signal S has a high level, the register circuit 9a latches the scan data SIN input to its scan-in terminal SI and outputs latch data SO1 from its scan-out terminal ST. In the same manner, when the input signal S has a high level, the register circuit 9b latches the data SO1 input to its scan-in terminal SI and outputs latch data SO2 from its scan-out terminal SO.

The selector 23 is provided with a scan clock SCAN_CK from an external circuit (not shown) during a scan mode and a normal clock signal CLKP from the CPU 11 during a normal mode. Based on the output signal of the OR circuit 22, the selector 23 provides the register circuits 9a and 9b with the normal clock signal CLKP as a clock signal CK during the normal mode.

The register circuit 21 is provided with a reset mask signal RST_MASK as a clear signal CL. The reset mask signal RST_MASK may be set by, for example, a scan mode signal SCAN_MD. When the reset mask signal RST_MASK has a low level, the register circuit 21 resets its output signal Q to a low level, or "0".

The NOR circuit 24 is provided with the reset signal RST and the reset mask signal RST_MASK.

The output signal of the NOR circuit 24 is provided to the OR circuit 25. The reset mask signal RST_MASK is also provided to the OR circuit 25. The output signal of the OR circuit 25 is provided as a clear signal CL to the registers 9a and 9b. When the clear signal CL has a low level, the register circuits 9a and 9b each reset its output signal Q to a low level, or "0".

Figures 5, 6:
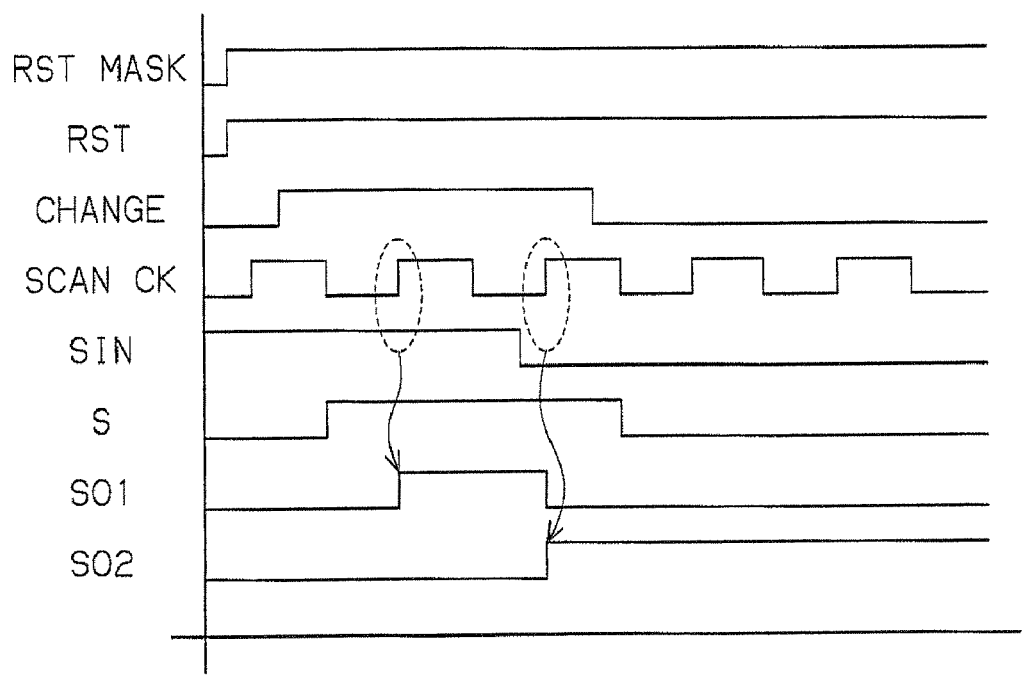
FIG. 5 is a table illustrating the operation of the scan shift circuit shown in FIG. 4.
FIG. 6 is a schematic timing waveform diagram illustrating the operation of the scan shift circuit shown in FIG. 4 when initial values are set.

FIG. 5 shows the state of the clear signal CL, which is determined by the operations of the NOR circuit 24 and the OR circuit 25. As shown in FIG. 5, the clear signal CL is set to a low level only when the reset signal RST has a high level and the reset mask signal RST_MASK has a low level.

The operations performed during a transfer mode, which is for setting the initial value of each of the register circuits 9a and 9b in the scan shift circuit of FIG. 4, will now be described with reference to FIG. 6. The transfer mode is performed by using the operations of the scan mode performed by the scan shift circuit. In the transfer mode, the scan mode signal SCAN_MD is set to a low level.

When the reset signal RST and the reset mask signal RST_MASK both have a high level and the switching signal CHANGE provided to the register circuit 21 has a high level, the output signal Q of the register circuit 21 is set to a high level based on the low level original clock signal/CLKX. As a result, the output signal of the OR circuit 22, that is, the input signal S of the register circuits 9a and 9b, is set to a high level. The high level input signal S causes the register circuits 9a and 9b to enter a transfer mode that uses the operations of the scan mode.

In this state, high level scan data SIN is provided to the register circuit 9a, and the scan clock SCAN_CK is provided via the selector 23 to the register circuits 9a and 9b. The register circuit 9a latches the high level scan data SIN when the scan clock SCAN_CK first rises. As a result, the latch data SO1 of the register circuit 9a is set to a high level.

Then, the scan data SIN is shifted to a low level. When the scan clock SCAN_CK rises the next time, the register circuit 9b latches the latch data SO1 (high level) of the register circuit 9a. As a result, the latch data SO2 of the register circuit 9b is set to a high level. In this state, the latch data SO1 of the register circuit 9a has a low level due to the low level scan data SIN.

Afterwards, the switching signal CHANGE is set to a low level. The output signal Q of the register circuit 21 is set to a low level based on the low level original clock signal/CLKX. As a result, the output signal of the OR circuit 22 is set to a low level. This cancels the transfer mode of the register circuits 9a and 9b and ends the transfer of the scan data SIN.

The execution of the transfer mode stores the data SO1 of "0" as an initial value in the register circuit 9a and the data SO2 of "1" as an initial value in the register circuit 9b. The data SO1 and SO2 may be set in any manner by adjusting the scan data SIN during the transfer mode.

When conducting the scan shift test with the above scan shift circuit, the reset signal RST and the reset mask signal RST_MASK are set to a low level and the output signal of the OR circuit 25 is set at a high level as an initial state. In this situation, the clear operations of register circuits 9a and 9b and the other register circuits of the scan chain are cancelled.

In this state, the scan mode signal SCAN_MD is set to a high level. As a result, the output signal of the OR circuit 22 shifts to a high level and the group of register circuits in the scan chain is set to a scan mode. In the scan mode, the scan clock signal SCAN_CK is provided to each of the circuits in the register circuit group, and the scan data SIN is sequentially transferred from the head register circuit 9a to the following register circuits in synchronism with the scan clock signal SCAN_CK.

When resetting the values stored in the register circuit group after the scan shift test is completed, the reset signal RST is set to a high level and the reset mask signal RST- _MASK is set to a low level (refer to FIG. 5). As a result, the output signal of the OR circuit 25 shifts to a low level. Thus, the value stored in each register circuit is reset to, for example, "0".

In a semiconductor integrated circuit device including the above scan shift circuit and clock signal transmission circuit, the scan shift test is conducted during a function test. After the scan shift test is completed, the values stored in the register circuit group of the scan chain are reset to 0. The semiconductor integrated circuit device is shipped out of the factory when all function tests are completed.

Subsequent to shipment, a user may set the initial values (SO1 and SO2) of the wait time T for the clock signal transmission circuit in accordance with the characteristics of the clock signal generation circuit.

More specifically, after supplying the semiconductor integrated circuit with power, the scan shift circuit shown in FIG. 4 performs the operations shown in FIG. 6 (transfer mode). This sets, for example, the initial value of the register circuit 9a to "0" and the initial value of the register circuit 9b to "1". The transfer mode operations end within a time corresponding to substantially two cycles of the scan clock signal SCAN_CK (refer to FIG. 6).

Then, initial settings are made to the clock signal transmission circuit. In this state, at least the reset mask signal RST_MASK is maintained at a high level. Accordingly, the values stored in the register circuit group, which includes the register circuits 9a and 9b, are not reset.

Figures 2, 3:
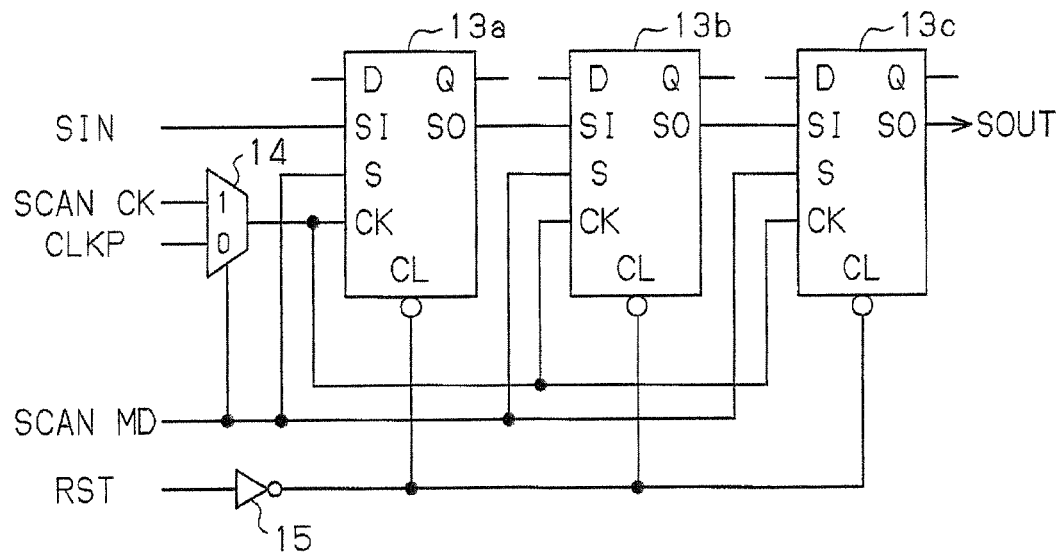
FIG. 2 is a table showing the conditions of the wait time set for a counter (register circuit) shown in FIG. 1A.
FIG. 3 is a schematic circuit diagram of a conventional scan shift circuit.

When the data SO1 of "0" and the data SO2 of "1" are respectively set as the initial values of the register circuits 9a and 9b, the selector 8 of the clock signal transmission circuit selects the wait time signal OS10, which is output from the counter 6, in accordance with the selection signal SL1 of "0" and the selection signal SL2 of "1". Accordingly, as shown in FIG. 2, the wait time T (initial value) is 512 µsec.

When the wait time T elapses, the clock control unit 7 provides the CPU 11 with the clock signal CLK and starts normal operation of the CPU 11. Prior to the normal operation of the CPU 11, the reset mask signal RST_MASK is set at a low level, and the reset signal RST is set at a high level. As a result, the stored value is reset in each register circuit that should receive the output signal of the OR circuit 25 as the clear signal CL. In other words, at least the reset mask signal RST_MASK is maintained at a high level until the clock control unit 7 starts to provide the CPU 11 with the clock signal CLK in accordance with the wait time signal selected by the selector 8. This prevents the initial values held by the register circuits 9a and 9b from being reset before the CPU 11 is provided with the clock CLK.

The semiconductor integrated circuit device including the scan shift circuit and the clock signal transmission circuit of the preferred embodiment has the advantages described below.

(1) Any one of a plurality of predetermined wait times may be selected as the wait time T for waiting until the original clock signal CLKX stabilizes after the power goes on before the clock signal CLK is provided to the CPU 11. Accordingly, the wait time T may be set in accordance with the characteristics of the clock signal generation circuit.

(2) The initial value setting circuit 16 variably sets the wait time T of the register circuits 9a and 9b in the clock signal transmission circuit. As a result, the clock signal transmission circuit selects one of the wait time signals OS00 to OS11 based on the initial values set for the register circuits 9a and 9b to determine the wait time T during activation of the semiconductor integrated circuit device.

(3) The initial values of the wait time T set for the register circuits 9a and 9b may be set by the scan shift operations of the scan shift circuit.

(4) The register circuits 9a and 9b for setting the initial values of the wait time T are arranged at the head of the scan shift circuit (scan chain). Thus, the setting of the initial values for the register circuits 9a and 9b (i.e., transfer mode) can be completed within a time corresponding to two cycles of the clock signal SCAN_CK. Accordingly, the time required for the initial setting of the register circuits 9a and 9b is significantly shorter than the wait time T. For this reason, the time the CPU 11 starts to provide the CPU 11 with the clock signal CLK is not delayed even when the initial values are set for the register circuits 9a and 9b after the power goes on and the wait time T of the clock signal transmission circuit is set afterwards based on the initial values.

It should be apparent to those skilled in the art that the embodiment may be embodied in many other specific forms without departing from the spirit or scope of the aforementioned embodiment. Particularly, it should be understood that the embodiment may be embodied in the following forms.

The register circuits 9a and 9b do not have to be arranged at the head of the scan shift circuit (scan chain). However, the initial values would have to be transferred from the head register circuit to the register circuits 9a and 9b. This would lengthen the time required to set the initial values.

Instead of providing the scan data SIN from an external circuit, the initial values may be set for the register circuits 9a and 9b by selectively using one of a plurality of patterns of the scan data SIN stored in the semiconductor integrated circuit device.

The scan shift circuit including the initial value setting circuit 16 of FIG. 4 may use any register circuit in the scan chain to set an initial value for a signal that sets items other than the wait time T (e.g., mode setting signal).

The scan shift circuit including the initial value setting circuit 16 of FIG. 4 may set any initial value for each circuit in the register circuit group of the scan chain so that the semiconductor integrated circuit device can immediately start any mode when the clock signal CLK is provided to the CPU 11.

The present examples and embodiments are to be considered as illustrative and not restrictive, and the embodiments are not to be limited to the details given herein, but may be modified within the scope and equivalence of the appended claims.

What is claimed is:

1. A clock signal transmission circuit for providing a clock signal to an internal circuit, the clock signal transmission circuit comprising:
    a clock control unit which provides the internal circuit with the clock signal that is generated from an original clock signal;
    a wait time setting unit which generates a plurality of wait time signals to wait until the original clock signal stabilizes before providing the clock signal to the internal circuit; and
    a wait time determination unit which selects one of the plurality of wait time signals and provides the selected wait time signal to the clock control unit, the wait time determination unit including:
        a data holding circuit which generates a selection signal in accordance with an initial value;
        a selection circuit which selects one of the plurality of wait time signals based on the selection signal; and
        an initial value setting circuit which variably sets the initial value of the data holding circuit.

2. The clock signal transmission circuit according to claim 1, wherein the data holding circuit and the initial value setting circuit are operable as a scan shift circuit, and the initial value setting circuit includes a transfer control unit which transfers the initial value to the data holding circuit of the scan shift circuit.

3. The clock signal transmission circuit according to claim 2, wherein the initial value is set by transferring scan data to the data holding circuit of the scan shift circuit.

4. The clock signal transmission circuit according to claim 2, wherein the scan shift circuit includes a plurality of series-coupled register circuits, and the data holding circuit is at least one of the plurality of register circuits and arranged at the head of the plurality of register circuits.

5. The clock signal transmission circuit according to claim 4, wherein the scan shift circuit is operable in a scan mode that uses first scan data and a transfer mode that uses second scan data, and the initial value setting circuit sets the initial value of the data holding circuit based on the second scan data in the transfer mode.

6. The clock signal transmission circuit according to claim 2, wherein the transfer control unit includes:
a transfer mode setting unit which operates the scan shift circuit in a transfer mode; and
a clock transmission unit coupled to the transfer mode setting unit to provide the data holding circuit with a scan clock signal that is usable when transferring the initial value.

7. The clock signal transmission circuit according to claim 6, wherein:
the transfer mode setting unit generates a transfer mode signal which operates the data holding circuit in the transfer mode based on a switching signal; and
the clock transmission unit includes a selector which provides the data holding circuit with the scan clock signal in response to the transfer mode signal.

8. The clock signal transmission circuit according to claim 6, wherein the transfer control unit further includes:
a reset mask unit which prevents the initial value transferred to the data holding circuit from being reset until the clock control unit starts to provide the internal circuit with the clock signal in accordance with the selected wait time signal.

9. The clock signal transmission circuit according to claim 8, wherein the reset mask unit includes:
a NOR circuit which receives a reset signal and a reset mask signal and generates a NOR signal; and
an OR circuit which receives the NOR signal and the reset mask signal and generates an OR signal that is capable of resetting the data holding circuit.

10. The clock signal transmission circuit according to claim 1, wherein the wait time setting unit and the wait time determination unit are operated before the internal circuit is initialized.

11. A method for providing a clock signal to an internal circuit, the method comprising:
generating the clock signal from an original clock signal;
generating a plurality of wait time signals to wait until the original clock signal stabilizes before providing the clock signal to the internal circuit;
generating a selection signal which is used to select one of the plurality of wait time signals with a data holding circuit; and
setting a variable initial value for the selection signal of the data holding circuit with an initial value setting circuit before generating the selection signal.

12. The method according to claim 11, further comprising:
operating the data holding circuit and the initial value setting circuit as a scan shift circuit;
wherein said setting an initial value for the selection signal includes transferring the initial value to the data holding circuit of the scan shift circuit.

13. The method according to claim 12, wherein said setting an initial value for the selection signal includes transferring scan data to the data holding circuit of the scan shift circuit.

14. The method according to claim 11, further comprising:
maintaining the initial value set for the data holding circuit until the clock signal is provided to the internal circuit in accordance with the wait time signal selected by the selection signal.

* * * * *